United States Patent [19]

Thornton et al.

[11] Patent Number: 5,010,663
[45] Date of Patent: Apr. 30, 1991

[54] LOW PERMEABILITY FABRIC AND METHOD OF MAKING SAME

[75] Inventors: Peter B. Thornton, Bronxville; Stanley H. Cone; George W. Booz, both of Hornell, all of N.Y.

[73] Assignee: Stern & Stern Industries, Inc., New York, N.Y.

[21] Appl. No.: 544,127

[22] Filed: Jun. 26, 1990

Related U.S. Application Data

[62] Division of Ser. No. 264,158, Oct. 28, 1988, Pat. No. 4,977,016.

[51] Int. Cl.$^5$ .................. D03D 1/00; B60R 21/16; D06F 61/02
[52] U.S. Cl. ............................ 38/52; 280/728; 428/225; 428/229; 428/255; 38/44; 38/144
[58] Field of Search ............... 38/44, 45, 49, 52, 144; 26/3-6; 28/103, 116, 134, 135, 137; 427/244, 245; 428/219, 225, 229, 255, 257; 249/160, 162, 192, 194, 234; 280/727, 728, 743; 69/7.5

[56] References Cited

U.S. PATENT DOCUMENTS

| | | | |
|---|---|---|---|
| 1,535,660 | 4/1925 | France | 38/52 |
| 2,640,343 | 6/1953 | Stout | 69/7.5 X |
| 2,825,156 | 3/1958 | Kinzelman | 38/44 |
| 2,828,528 | 4/1958 | Kajjar | 38/44 X |
| 3,879,057 | 4/1975 | Kawashima et al. | 280/743 |
| 3,937,488 | 2/1976 | Wilson et al. | 280/743 X |
| 4,543,113 | 9/1985 | Forester et al. | 428/225 X |
| 4,601,937 | 7/1986 | Latussek | 38/144 X |
| 4,872,276 | 10/1989 | Godfrey | 428/225 X |
| 4,921,735 | 5/1990 | Bloch | 428/225 X |
| 4,977,016 | 12/1990 | Thornton et al. | 428/225 |

Primary Examiner—Werner H. Schroeder
Assistant Examiner—Ismael Izaguirre
Attorney, Agent, or Firm—Amster, Rothstein & Ebenstein

[57] ABSTRACT

A strong, lightweight, thin, flexible fabric of low permeability comprising an uncoated woven cloth characterized by a permeability of not more than one cubic foot of air per minute per square foot of cloth (0.5 cm$^3$/sec/cm$^2$) at a pressure drop of 0.5 inch of water (1.27 cm) across the cloth. The cloth is calendered on both sides to reduce its permeability.

10 Claims, 1 Drawing Sheet

LOW PERMEABILITY FABRIC AND METHOD OF MAKING SAME

This is a division of co-pending application Ser. No. 264,158, filed on Oct. 28,1988, now U.S. Pat. No. 4,977,016, issued 12/11/90.

BACKGROUND OF THE INVENTION

The present invention relates to a fabric of low permeability suitable for use in an air bag and, more particularly, to such a fabric formed of an uncoated woven cloth.

Low permeability fabrics have a multitude of potential uses, e.g., air-filled or water-filled mattresses, sleeping bags, pillows, life belts, life boats, chairs, ottomans, etc. Each of these alternative uses may have a different maximum permeability requirement.

Among the most demanding and critical of this multitude of potential uses is their employment in expansible passenger restraint bags for automobiles ("air bags"). The air bags are adapted to be inflated instantaneously with high pressure gas in the event of a collision to prevent the movement of the occupant for safety reasons. For this purpose, the air bag is generally made of an air-impermeable material and formed with an opening from which the high pressure gas introduced into the bag is exhausted, whereby the energy resulting from the occupant's striking against the bag upon a collision and the energy of the subsequent pressing movement are absorbed to reduce the impact. This potentially life-saving use requires that the fabric exhibit not only low permeability, but also be strong, lightweight, thin and flexible so that it can be easily and compactly folded into its appropriate storage container ready for use, withstand the strong shock occurring when it is initially deployed, and add as little weight as possible to the person or vehicle transporting it.

In the past, fabrics intended for use in air bags have been made from a wide variety of materials including macromolecular film (such as polyethylene) and inorganic fibers (such as glass fiber).

Such patents as U.S. Pat. No. 3,705,645 and U.S. Pat. No. 3,892,425 illustrate the conventional manner of forming such fabrics from a woven cloth by coating the cloth with a resin binder to reduce its permeability. Low permeability fabrics for use in air bags are conventionally made of nylon or polyester which has been coated with neoprene, urethane, or silicon resin, even though the coating necessarily increases the weight, thickness (bulk), stiffness, and cost of the cloth while reducing its flexibility, tear strength, over-all strength (due to prolonged exposure to heat during the coating operation) and shelf-life (as the coatings tend to degrade over time). Variations in the coating thickness from lot to lot or within a single lot can also introduce undesirable permeability fluctuations for a given piece of fabric.

U.S. Pat. No. 3,730,551 discloses a knit or woven nylon or polyester material suitable for use in an air bag, but there is no specific disclosure of the permeability of the fabric or precisely how the fabric is woven (or coated) to provide a suitable permeability according to 1971 standards.

In any case, air bag manufacturers have recently proposed a new and extremely rigorous requirement of low permeability for an uncoated fabric not exceeding one cubic foot of air per minute per square foot cf cloth (0.5 $cm^2/sec/cm^2$) at a pressure drop of 0.5 inch of water (1.27 cm) across the cloth (i.e., 1 CFM). In addition, an air bag fabric should be flexible, thin, preferably with a thickness of less than 0.016 inch (0.041 cm), lightweight, preferably with a weight of not more than 8.25 oz/square yard (280 $gms/m^2$), and strong, preferably with a strength characterized by a tensile strength of at least 300 lbs (1334 newtons), a Mullen burst strength of at least 650 psi (4482 kilopascals), and a trapezoid tear of at least 40 lbs. (178 newtons). Preferably the fabric should also be flexible, compactable, have an elongation at break of at least 25%, and exhibit a storage or shelf life of 5 to 10 years without substantial deterioration.

A strong, lightweight, thin, flexible fabric has been sold for use in bomb parachutes as a bomb parachute (for the controlled descent of a bomb, rather than a person), but this fabric was characterized by a permeability of about 1.5-2.0 CFM (specification maximum 3.0 CFM) and thus would not meet the aforenoted extremely low permeability requirement of the proposed new standard for an air bag fabric. Further, the fabric, made of an uncoated, woven nylon calendered on one side to reduce permeability (210/34/0 multifilament yarn woven in a 1×2 modified Oxford weave, 80 ends/inch×80 picks/inch), exhibited low flexibility and hence poor compactability.

Thus, the need remains for a fabric which is strong, lightweight, thin and flexibile, yet of extremely low permeability.

Accordingly, it is an object of the present invention to provide a strong, lightweight, thin, flexible fabric having a permeability of not more than 1 CFM.

Another object is to provide such a fabric which is suitable for use in air bags.

A further object is to provide a method of making such a fabric or a similar one having a permeability of not more than 3 CFM.

SUMMARY OF THE INVENTION

It has now been found that the above and related objects of the present invention are obtained in a strong, lightweight, thin, flexible fabric of low permeability comprising an uncoated woven cloth characterized by a permeability of not more than one cubic foot cf air per minute per square foot of cloth (0.5 $cm^3/sec/cm^2$) at a pressure drop of 0.5 inch of water (1.27 cm) across the cloth (i.e., 1 CFM). Preferably the fabric is further characterized by a Mullen burst strength of at least 650 psi (4482 kilopascals), a tensile strength of at least 300 lbs. (1334 newtons), a trapezoid tear of at least 40 lbs. (178 newtons), an elongation at break of at least 25%, a weight of not more than 8.25 oz/square yard (280 $gm/m^2$), and a thickness of less than 0.016 inch (0.041 cm).

In a preferred embodiment, the cloth is polyester and woven in a plain or basket weave, preferably a 1×1 plain or 2×2 basket weave. The cloth is woven about 51–52 ends/inch by about 43–52 picks/inch (20 ends/cm by 17–20.5 picks/cm). The cloth is woven of not greater than 600 denier multifilament yarn, preferably 400–600 denier multifilament yarn, having 100–300 filaments.

The low permeability is achieved by calendering the cloth on both sides.

The invention also encompasses a method of making such a fabric by providing an uncoated, woven, strong, lightweight, thin, flexible cloth of high permeability. Then the cloth is calendered on both sides to reduce the permeability to not more than 3 CFM, preferably to not more than 1 CFM.

In a preferred embodiment the cloth is calendered in a calender exerting a pressure of 65–75 psi (448–517 kilopascals) at a temperature of about 350°–370° F. (177°–188° C.), preferably a calender exerting a pressure of 70 psi (483 kilopascals) at a temperature of about 360° F. (182° C.). Thus the cloth may be calendered in a calender exerting 65–80 tons/70 inch base (59.0–72.6×10$^6$ gm/178 cm) at a nominal nip of 0.5 inch (1.27 cm) at a temperature of 350°–370° F. (177°–188° C.), preferably a calender exerting about 70 tons (63.5×10$^3$ kilograms) at a temperature of about 360° F. (182° C.).

The invention further encompasses the fabric produced by the method.

BRIEF DESCRIPTION OF THE DRAWING

The above brief description, as well as further objects and features of the present invention, will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENT

Figure 1:
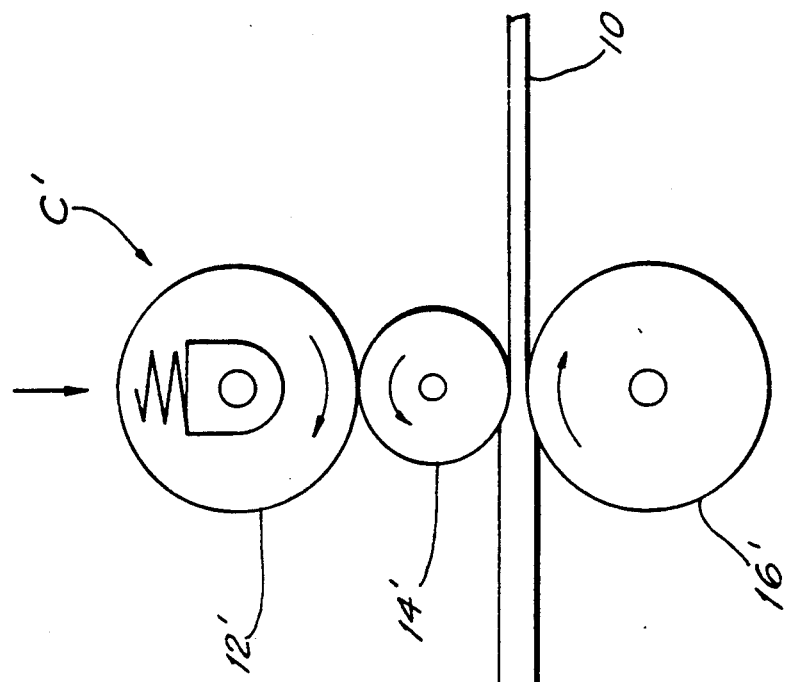
FIG. 1 is a schematic view of the cloth passing through a calender which calenders both sides of the cloth, according to the method of the present invention.
Figure 1:
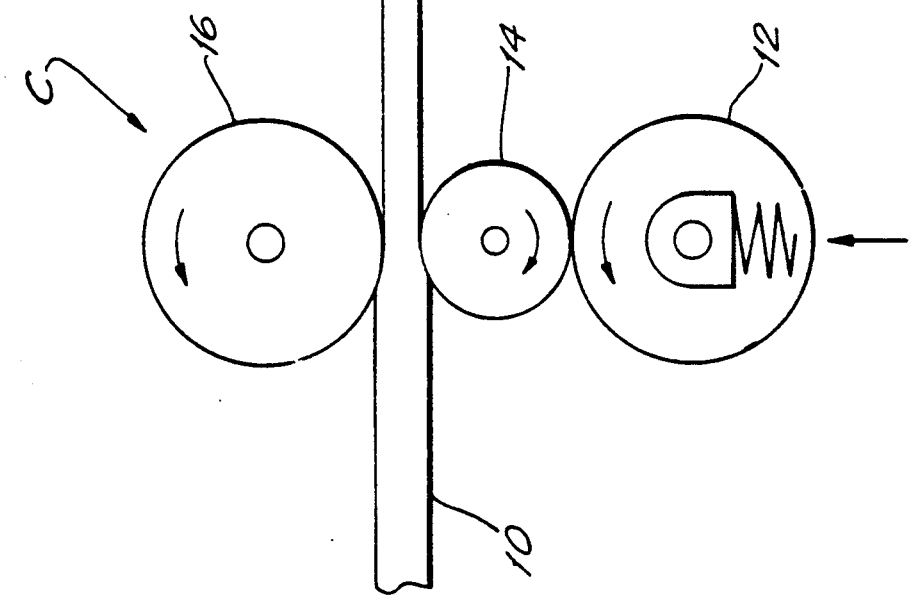

One aspect of the present invention comprises a strong, lightweight, thin, flexible fabric of low permeability comprising an uncoated woven cloth characterized by a permeability of not more than one cubic foot of air per minute per square foot of cloth (0.5 cm$^2$/sec/cm$^2$) at a pressure drop of 0.5 inch of water (1.27 cm) across the cloth (hereinafter CFM).

The level of low permeability required in the fabric will vary according to the requirement of a particular manufacturer for a given application. In the past it has been exceedingly difficult to reliably and consistently obtain low permeability in uncoated fabrics and, accordingly, a permeability of 3 CFM or less has been considered to be "zero" permeability and sufficient to meet the most stringent of air bag manufacturer's requirements. On the other hand, the proposed new standards for uncoated air bag fabrics require a permeability of not more than 1 CFM, a standard which must be met uniformly and consistently both throughout a batch and from batch to batch over time.

The strength of the fabric is a composite of its Mullen burst strength, its tensile strength and its trapezoid tear strength. More particularly, its Mullen burst strength is at least 650 psi (4482 kilopascals), its tensile strength is at least 300 lbs. (1334 newtons), and its trapezoid tear strength is at least 40 lbs. (178 newtons). Preferably its elongation at break is at least 25%. The high strength characteristic of the fabric is an essential characteristic of a fabric intended for use in an air bag where the air bag must be able to withstand the initial shock of an explosive inflation and immediately thereafter the impact of someone hitting it as the passengers are thrown forward. It must withstand these forces without bursting, tearing or stretching to the point where the air bag no longer serves its protective function.

To be suitable for use in air bags, the fabric must also be lightweight, thin and flexible as the air bag formed of the fabric must be capable of being folded and compacted so as to fit within an extremely limited volume, such as that available within the steering column or about the already crowded dashboard panel adjacent the driver. As a practical matter, the fabric must also be lightweight so that the air bag does not contribute unnecessarily to the weight of the car, thereby reducing mileage. Thus the weight of the fabric is not more than 8.25 ounces per square yard (280 gm/m$^2$), and the thickness is less than 0.016 inch (0.041 cm).

The properties of the fabric discussed herein are determined by Federal Test Method Standard No. 191A and, in particular, for permeability Method 5450, for burst strength Method 5122, for tensile strength and elongation, Method 5100 Grab, for tear strength Method 5136, for weight Method 5041, and for thickness Method 5030.

According to the present invention, the fabric is preferably formed of nylon or polyester yarn, with polyester yarn being preferred over nylon yarn for reasons unique to the present invention as will be explained hereinafter. Other thermoplastic yarn may be used for particular applications.

The cloth is woven of multifilament yarn not greater than 600 denier, and preferably 400–600 denier, 100–300 filaments per yarn bundle. Lower denier yarns provide lightness and thinness, but afford less strength and are more expensive as more yarn and more weaving is required to provide the same coverage. Higher denier yarn tends to produce a heavier and thicker fabric which is harder to fold and makes control of the permeability during the manufacturing process difficult, especially during the manufacturing process of the present invention as will be explained hereinafter. More particularly, the warp yarn is preferably 440/100/3¼ Z (that is, 440 denier, 100 filaments per yarn bundle, 3¼ turns per inch of yarn with a counter-clockwise twist), and the fill yarn is preferably 440/100/0 (that is, 440 denier, 100 filaments per yarn bundle, with a zero or "producer's" twist). A minimum of 100 filaments per yarn bundle is preferred.

In order to enhance the flexibility of the woven cloth, the cloth is woven in a basket weave, preferably a 2×2 basket weave. It will be appreciated that the use of a basket weave, and in particular a 2×2 basket weave, increases the permeability of the cloth. Nonetheless, the processing of the cloth according to the present invention so decreases its permeability as to enable use of the 2×2 basket weave while still enabling the cloth to meet the low permeability requirement. As the forces exerted on the fabric may be in any direction, it is preferred to use a weave which provides a balanced strength extending in all directions, such as a basket weave (as opposed to an Oxford weave). Other weaves may be employed instead of a basket weave—e.g., a 1×1 plain weave. A 1×1 plain weave is naturally tighter than a 2×2 basket weave and thus provides an even lower permeability. Furthermore, the seam slippage is decreased so that there is less windowing or opening of the seam during inflation, thereby improving the dynamic permeability of the fabric. While the 1×1 plain weave is naturally stiffer than a 2×2 basket weave, it has been found to be thinner by about 20%. The increased thinness compensates for the increased tightness so that the two weaves afford generally comparable compactability.

The cloth is preferably woven, for a 2×2 basket weave, about 52 ends/inch (20.5 ends/cm) and 52 picks/inch (20.5 picks/cm) to provide a desirable tightness of the weave, although greater and fewer picks and ends per inch may be used. (About 51 ends/inch and 43 picks/inch are suitable for a 1×1 plain weave.) The optimum end and pick count will depend to a large degree upon the thickness (i.e., denier) of the yarn. For thick 600 denier yarn, the end and pick count may be as much as 33% less. For thin 400 denier yarn, a variation of ±5% in end and pick count is acceptable. The tighter the weave (that is, the higher the end and pick count) the less permeable the cloth; on the other hand, the looser the weave (that is, the lower the end and pick count), the less expensive the cloth in terms of both yarn material and weaving costs).

The desired low permeability of the fabric of the present invention is achieved by calendering the uncoated woven cloth on both sides thereof to reduce its permeability while at the same time retaining its desirable characteristics of high strength, lightweight, thinness, and flexibility. While the calendering operation will be discussed hereinbelow in terms of reducing the permeability to not more than 1 CFM, clearly the parameters of the same calendering operation can be adjusted to provide a fabric having any permeability of not more than 3 CFM. It is believed that the calendering operation replasticizes the thermoplastic material of the woven cloth and squashes and flattens the high points on both sides of the fabric to block the permeability-providing interstices. The calendering operation produces a glossy sheen on the calendered side of the fabric, so that a fabric which has been calendered on both sides is easily distinguishable from uncalendered fabric or fabric which has been calendered on only one side.

Calendering of the cloth on both sides thereof may be performed in a number of different ways depending on such factors as the number of available existing calenders, the willingness to create specialized calendering equipment, the desirability of continuous versus batch operation, and the like. As in a standard calendering operation, prior to calendering the cloth is typically scoured to clean the same (with detergent, anti-bacterial or anti-fungal ingredients, dyes and other conventional materials added, as desired), and then dried and heat set in a tenter oven (for example, at 250° F.). In order to exert pressure on the cloth as it passes through the calender, the cloth is insulated from the pressure roll (typically made of steel) by a cushioning roll (typically a steel roll having a number of coaxial disks of cotton paper thereabout). The hot roll (typically made of steel) on the other side of the cloth is heated to about 350°-370° F., for example, by hot oil flowing therethrough. In order to perform the second calendering operation—that is, the calendering of the opposite side of the cloth—in a batch process, the cloth may be inverted (to exchange sides) and passed through the same calendar a second time. Alternatively, in a continuous process, the cloth may be passed through an inverted second calender—that is, a calender having the pressure and cushioning roll combination interchanged with the hot roll.

Referring now to the drawing, therein illustrated is a continuous process for the calendering of cloth on both sides according to the present invention. The scoured and dried cloth 10 emerging from a tenter oven (not shown) passes through a conventional calender generally designated C including a pressure roll 12 bearing upwardly on a cushioning roll 14 in turn bearing upwardly on the bottom cloth surface, with a hot roll 16 bearing downwardly on the upper cloth surface. Subsequently the cloth 10, now calendered on the bottom surface, passes through an inverted calender generally designated C' including a pressure roll 12' bearing downwardly on a cushioning roll 14' in turn bearing downwardly on the upper cloth surface, with a hot roll 16' bearing upwardly on the bottom cloth surface. The resultant cloth is calendered on both its top and bottom surfaces.

It will be appreciated that the two calendering operations can be performed using a single modified calendar having, for example, a cushioning roll and a hot pressure roll on each side of the cushioning roll. The cloth would pass initially between the cushioning roll and the first hot pressure roll and then, after being twisted so that the calendered cloth surface which was adjacent the cushioning roll is now remote from the cushioning roll, loop back between the cushioning roll and the second hot pressure roll.

Preferably the calenders exert a pressure of 65–75 psi (448–517 kilopascals) at a temperature of 350°–370° F. (177°–188° C.). A pressure of about 70 psi (483 kilopascals) and a temperature of about 360° F. (182°) are preferred. Typically higher pressures are utilized in connection with lower temperatures, and lower pressures are utilized in conjunction with higher temperatures. For example, the calender may exert a pressure of 65–80 tons per 70 inches of (59.0–72.6×$10^3$ kilograms for a 178 cm base) at a nominal nip of 0.5 inch (1.27 cm), preferably about 70 tons (63.5×$10^3$ kilograms).

Where substantially higher calendering pressures are utilized, the low permeability is obtained only at the cost of the strength of the fabric which in effect becomes a plain sheet of plastic lacking the strength of a woven. Where the calendering pressure is substantially lower, the calendering operation fails to squash and flatten the high spots of the cloth as necessary to achieve low permeability.

As each calendering operation subjects the cloth to an elevated temperature for only a short duration (e.g., approximately one second), the cloth is not thermally degraded as it is during a coating operation, where the exposure of the cloth to an elevated temperature is prolonged.

It is theorized that the calendering operation to a limited degree replasticizes the thermoplastic material of the woven cloth and mashes down the hills or high spots of the woven cloth, thereby to close the adjacent interstices and so reduce the overall permeability of the cloth. Calendering on both sides of the cloth is essential as apparently calendering on one side only does not effect blockage of each interstice (even when calendered twice on that side) while calendering on both sides) substantially reduces and almost eliminates the number of unblocked interstices. Alternatively, it is possible that calendering on one side only, while affecting substantially all interstices, fails to provide 100% blocking of each interstice, and the calendering on the opposite side provides the additional blockage of each interstice necessary to substantially reduce the permeability of the cloth. Indeed, the reason why it is preferred that the yarn of the present invention have a denier not exceeding 600, and preferably not exceeding 500, is that higher denier yarns have high spots which are difficult to mash down.

The reason why polyester cloth is preferred over nylon cloth in the present invention is that polyester retains its low permeability over an extended period of time (such as the 5 to 10 years of life which may be required for an automobile air bag). It will be appreciated that in a conventional air bag fabric where reduced permeability is obtained by coating, nylon remains a preferred material for a variety of reasons including ease of coating. On the other hand, in the fabric of the present invention where an uncoated fabric achieves low permeability through calendering, the polyester fabric affords enhanced longevity. It is theorized that the superiority of polyester over nylon for the purpose of the present invention arises out of its lower moisture regain properties. Both nylon and polyester are hydrophobic fibers, and both are thoroughly dried in the tenter oven prior to calendering. Over a period of time after calendering (during the 5-10 year anticipated lifetime of the air bag), the nylon fabric will exhibit a higher moisture regain (about 4.5%) relative to the polyester (about 0.4%). As the nylon fabric regains moisture, it also tends to resume its original woven configuration, with the one-time hills crushed by the calendering operation into or over the interstices departing the interstices and resuming their prior orientation, thus allowing a return to a higher permeability. Further, while the nylon fabric may initially exhibit a higher tensile strength (175-183 lbs.) than the polyester fabric (148 lbs.), after oven aging at 300° F. for 68 hours the nylon fabric tensile strength degrades sharply (to 83-87 lbs.) while the polyester fabric tensile strength remains substantially constant (at 148 lbs.).

EXAMPLES

Example I

This following example illustrates the relative effects of calendering both sides of a fabric, relative to calendering only one side of the fabric.

A test cloth had a warp of 440/100/3¼ Z yarn and a fill of 440/100/0 yarn. The cloth was a 2×2 basket weave.

Calendering was performed at a pressure of 70 psi and 360° F. for each run. One sample of the fabric was calendered twice on one side, and other sample of the fabric was calendered once on each side. Permeability of the fabric was measured before any calendering operation, after the first calendering operation, and after the second calendering operation. The resultamt permeabilities of the fabric samples are indicated in the Table.

TABLE

| | Calendering Same Side, CFM | Calendering Opposite Sides, CFM |
|---|---|---|
| Before Calendering | 24.20 | 22.90 |
| After 1st Calendering | 1.82 | 1.63 |
| After 2nd Calendering | 1.42 | 0.62 |

Thus, calendering on one side produced a very substantial lessening of permeability. While a second calendering on that one side afforded a further small decrement in permeability, a second calendering on the other side of the fabric produced a substantial decrease in permeability, one sufficient to reduce the permeability below the 1 CFM level. In other words, when calendering is performed on opposite sides of the fabric, the second calendering is more effective than when calendering is performed twice on the same side of the fabric. This is true both in terms of the absolute and relative decreases in permeability resulting from the second calendering operation. In absolute terms, the second calendering operation (on the opposite side) produced a decrease in permeability which was 2½ times that produced when calendering was performed twice on the same side; in relative terms (as a percentage of the permeability remaining after the first calendering operation), the decrease in permeability was almost three times greater.

After calendering on opposite sides, the cloth had 54 ends per inch and 51 picks per inch, and had a Mullen burst strength of 905 psi, a tensile strength of 548-558 lbs., a trapezoid tear strength of 208-372 lbs., an elongation at break of 38-50%, a weight of 7.22 oz./square yard and a thickness of 0.010 inch.

By way of comparison, a 1×1 plain polyester weave cloth of similar yarns had, after similar calendering on both sides, 51 ends per inch and 43 picks per inch and had a permeability of 0.21 CFM. The cloth had a Mullen burst strength of 825 psi, a tensile strength of 494-552 lbs., a trapezoid tear strength of 64-108 lbs., an elongation at break of 36-37%, a weight of 6.29 oz./square yard and a thickness of 0.0078 inch.

To summarize, the present invention provides an uncoated woven fabric which is strong, lightweight, thin and flexible, yet has an extremely low permeability—namely, a permeability not higher than 1 CFM—so as to render it suitable for use in air bags even according to proposed new standards.

Now that the preferred embodiments of the present invention have been shown and described in detail, various modifications and improvements thereon will become readily apparent to those skilled in the art. Accordingly, the appended claims are to be construed broadly in a manner consistent with the spirit and scope of the invention herein.

We claim:

1. A method of making a strong, lightweight, thin, flexible fabric of low permeability comprising the steps of:
   (A) providing an uncoated, woven, strong, lightweight, thin, flexible cloth of high permeability; and
   (B) calendering the cloth on both sides without thermal degradation to reduce the permeability to not more than three cubic feet of air per minute per square foot of cloth (1.5 cm$^3$/sec/cm$^2$) at a pressure drop of 0.5 inch of water (1.27 cm) across the cloth.

2. The method of claim 1 wherein the cloth is calendered to reduce its permeability while providing a Mullen burst strength of at least 650 psi (4482 kilopascals), a tensile strength of at least 300 lbs. (1334 newtons), a trapezoid tear of at least 40 lbs. (178 newtons), an elongation at break of at least 25%, a weight of not more than 8.25 oz/square yard (280/gm/m$^2$) and a thickness of less than 0.016 inch (0.041 cm).

3. The method of claim 1 wherein the cloth is calendered on both sides to reduce the permeability to not more than one cubic foot of air per minute per square foot of cloth (0.5 cm$^3$/sec/cm$^2$) at a pressure drop of 0.5 inch of water (1.27 cm) across the cloth.

4. The method of claim 1 wherein the cloth is calendered in a calender exerting a pressure of 65-75 psi (448-517 kilopascals) at a temperature of about 350°-370° F. (177°-188° C.).

5. The method of claim 4 wherein the cloth is calendered in a calender exerting a pressure of 70 psi (483 kilopascals) at a temperature of about 360° F. (182° C.).

6. The method of claim 1 wherein the cloth is calendered in a calender exerting 65-80 tons/70 inch base (59.0-72.6×10$^3$ kilograms/178 cm) at a nominal nip of 0.5 inch (1.27 cm) at a temperature of 350°–370° F. (177°–188° C.).

7. The method of claim 6 wherein the cloth is calendered in a calender exerting about 70 tons (63.5×10³ kilograms) at a temperature of about 360° F. (182° C.).

8. The fabric produced by the method of claim 1.

9. A method of making a strong, lightweight, thin, flexible fabric of low permeability comprising the steps of:
   (A) providing an uncoated, woven, strong, lightweight, thin, flexible cloth of high permeability; and
   (B) calendering the cloth on both sides without thermal degradation in a calendar exerting a pressure of 65–75 psi (448–517 kilopascals) at a temperature of 350°–370° F. (177°–188° C.) to reduce the permeability to not more than three cubic feet of air per minute per square foot of cloth (1.5 cm³/sec/cm²) at a pressure drop of 0.5 inch of water (1.27 cm) across the cloth while retaining a Mullen burst strength of at least 650 psi (4482 kilopascals), a tensile strength of at least 300 lbs. (1334 newtons), a trapezoid tear of at least 40 lbs. (178 newtons), an elongation at break of at least 25%, a weight of not more than 8.25 oz/square yard (280 gm/m²) and a thickness of less than 0.016 inch (0.041 cm).

10. The fabric produced by the method of claim 9.

* * * * *